United States Patent
Webster

(10) Patent No.: US 11,136,517 B2
(45) Date of Patent: Oct. 5, 2021

(54) METHOD FOR PRODUCING AGGLOMERATES FROM A BIOMASS STREAM

(71) Applicants: Pelleton Global Renewables Ltd., Tortola (VG); John Webster, St. Lucia (AU)

(72) Inventor: John Webster, St. Lucia (AU)

(73) Assignee: Pelleton Global Renewables Ltd., Tortola (VG)

( * ) Notice: Subject to any disclaimer, the term of this patent is extended or adjusted under 35 U.S.C. 154(b) by 73 days.

(21) Appl. No.: 16/497,882

(22) PCT Filed: Mar. 29, 2018

(86) PCT No.: PCT/AU2018/050303
§ 371 (c)(1),
(2) Date: Sep. 26, 2019

(87) PCT Pub. No.: WO2018/176107
PCT Pub. Date: Oct. 4, 2018

(65) Prior Publication Data
US 2020/0102517 A1    Apr. 2, 2020

(30) Foreign Application Priority Data
Mar. 28, 2017 (AU) ................. 2017901119

(51) Int. Cl.
*C10L 5/14* (2006.01)
*C10L 5/48* (2006.01)
(Continued)

(52) U.S. Cl.
CPC ............ *C10L 5/14* (2013.01); *C10L 5/363* (2013.01); *C10L 5/42* (2013.01); *C10L 5/442* (2013.01);
(Continued)

(58) Field of Classification Search
CPC ............ C10L 2250/04; C10L 2290/08; C10L 2290/141; C10L 2290/20; C10L 2290/24;
(Continued)

(56) References Cited

U.S. PATENT DOCUMENTS

2001/0013197 A1    8/2001  White
2017/0283615 A1*  10/2017  Williams ............... C08L 95/00

FOREIGN PATENT DOCUMENTS

| GB | 2402398 A | 12/2004 | |
| JP | 03195709 A * | 8/1991 | ........... C08F 220/04 |
| WO | 2011092503 A1 | 8/2011 | |

OTHER PUBLICATIONS

Magnussen et al. "Modeling for Estimation and Monitoring"; Nov. 26, 2004; p. 1 section 5; web page: http://www.fao.org/forestry/8758/en/ (Year: 2004).*

(Continued)

*Primary Examiner* — Ellen M McAvoy
*Assistant Examiner* — Chantel L Graham
(74) *Attorney, Agent, or Firm* — Greenberg Traurig, LLP; David L Dykeman; Natalie Salem

(57) ABSTRACT

The present invention relates to a method for producing agglomerates from a feedstock comprising at least one biomass stream, the method comprising the steps of: combining the feedstock with one or more binding reagents; and introducing the feedstock into an agglomeration apparatus in the presence of a polymerisation activator to produce the agglomerates.

21 Claims, 1 Drawing Sheet

(51) Int. Cl.
  *C10L 5/42*  (2006.01)
  *C10L 5/44*  (2006.01)
  *C10L 5/36*  (2006.01)
  *C10L 5/46*  (2006.01)

(52) U.S. Cl.
  CPC .................. *C10L 5/46* (2013.01); *C10L 5/48*
    (2013.01); *C10L 2250/04* (2013.01); *C10L 2290/08* (2013.01); *C10L 2290/141* (2013.01); *C10L 2290/20* (2013.01); *C10L 2290/24* (2013.01); *C10L 2290/28* (2013.01); *C10L 2290/546* (2013.01)

(58) Field of Classification Search
  CPC .. C10L 2290/28; C10L 2290/546; C10L 5/14; C10L 5/363; C10L 5/40; C10L 5/42; C10L 5/442; C10L 5/445; C10L 5/46; C10L 5/48; Y02E 50/10; Y02E 50/30
  See application file for complete search history.

(56) References Cited

OTHER PUBLICATIONS

Yamamoto et al.; JP03195709A BIB Translation; (Year: 1991).*
Yamamoto et al.; JP03195709A Description Translation (Year: 1991).*
International Search Report in International Application No. PCT/AU2018/050303 dated May 4, 2018.

* cited by examiner

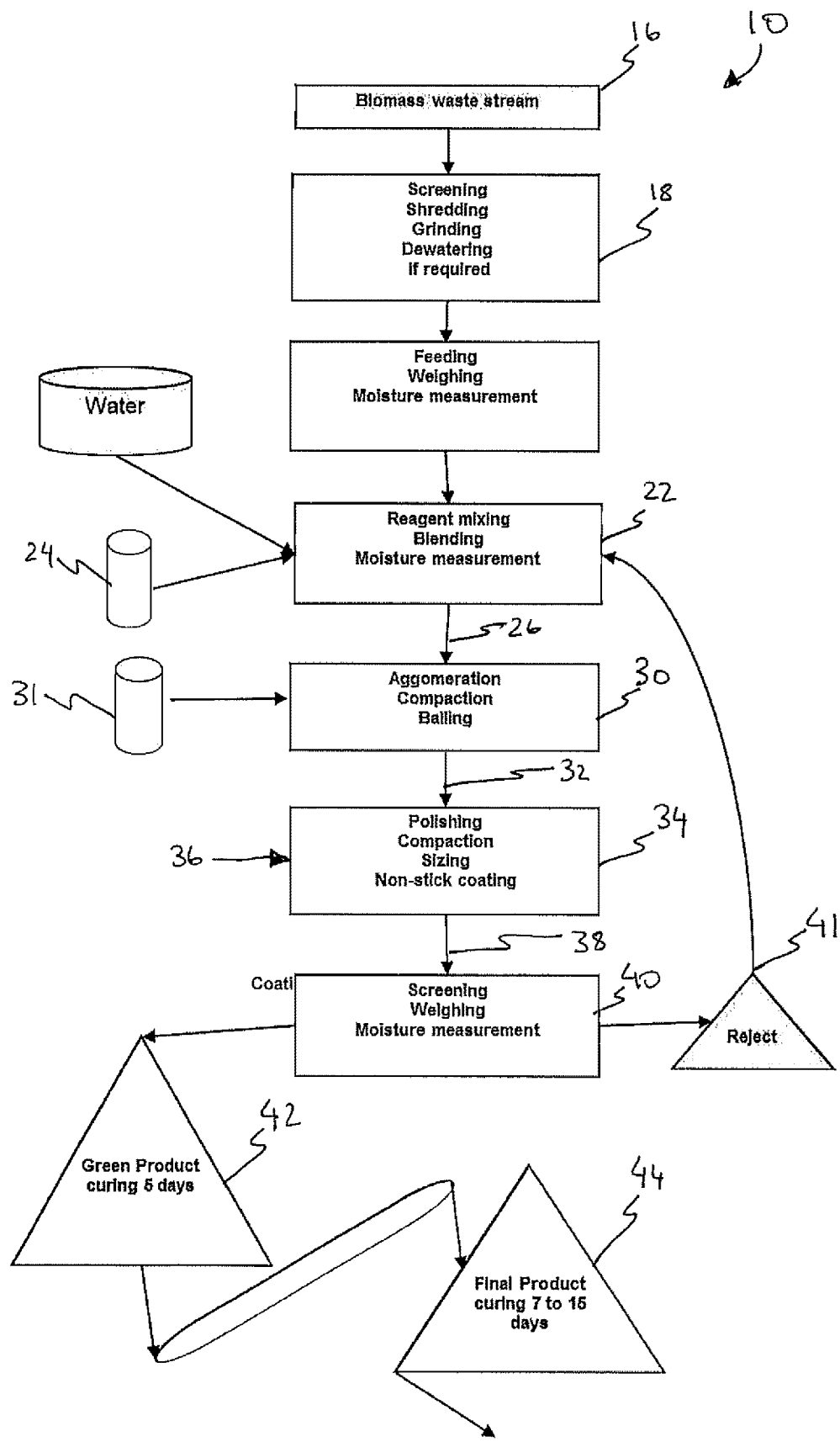

METHOD FOR PRODUCING AGGLOMERATES FROM A BIOMASS STREAM

CROSS-REFERENCE TO RELATED APPLICATIONS

This application is a U.S. national phase application of PCT International Patent Application No. PCT/AU2018/050303, filed on Mar. 29, 2019, which claims the benefit of and priority to Australian Application No. 2017901119, filed on Mar. 28, 2017, the contents of each of which are incorporated herein in their entireties.

TECHNICAL FIELD

In accordance with the represent invention, there is provided a method for producing agglomerates from a biomass stream. More specifically, forms of the present invention provide for a method of producing agglomerates which are suitable as a combustible fuel source.

BACKGROUND ART

The following discussion of the background art is intended to facilitate an understanding of the present invention only. The discussion is not an acknowledgement or admission that any of the material referred to is or was part of the common general knowledge as at the priority date of the application.

Modern industry produces significant biomass waste streams which have marginal value and will often require disposal as land fill. These waste streams typically comprise carbon-based materials that are in the form of a liquid/sludge. The main problem faced when handling such waste streams is the water content. These streams can have upwards of 85% water and will typically need to be subjected to a dewatering process to remove a substantial portion of this water. Such processes include drying under heat or centrifugation and require an energy expenditure greater than the economic return. There exists a need to be able to recycle these wastes in order to produce useful products, rather than disposing of them. Whilst this is achievable, it is not typically by way of a commercially viable means and so there is little economic incentive to do so. Additionally, known recycling methods are adapted to specific waste streams and do not allow for waste streams from multiple sources to be treated simultaneously.

SUMMARY OF INVENTION

In accordance with the present invention there is provided a method for producing agglomerates from a feedstock comprising at least one biomass stream, the method comprising the steps of:
  combining the feedstock with one or more binding reagents; and
  introducing the feedstock into an agglomeration apparatus in the presence of a polymerisation activator to produce the agglomerates.

The IUPAC Compendium of Chemical Terminology, 2nd ed. (the "Gold Book") defines agglomeration as the process in which dispersed molecules or particles assemble rather than remain as isolated single molecules or particles. Throughout this specification, unless the context requires otherwise, the term "agglomerate" or variations of such, will be understood to refer to an assemblage of discrete particles that are adhered together such that they behave as a single larger particle.

It is understood by the inventors that the polymerisation activator will initiate polymerisation or crosslinking of the one or more binding reagents. This polymerization or crosslinking produces a dense matrix that holds the solids content of biomass stream to form the agglomerates. A significant portion of the water content of the biomass stream is also held in the agglomerates. Advantageously, the inventors have found that even biomass streams with high water content may be agglomerated to produce agglomerates.

The inventors have found that the agglomerates produced by the present invention dry rapidly. Without wishing to be bound by theory, the inventors understand that the water content of the agglomerates is not absorbed by the polymerised binder, but rather it is retained within the polymer matrix (through Van der Waals forces). Once the agglomerates is formed, the surface tension reduction forces the water out of the matrix. This lowers the energy required for evaporation of the water from the agglomerates. Advantageously, the inventors have found that this leads to the rapid evaporation of the water from the agglomerates, enhancing the drying of these materials, allowing drying under moderate conditions.

In one form of the present invention, the water content of the biomass stream is at least 30%. In an alternative form of the present invention, the water content of the biomass stream is at least 35%. In an alternative form of the present invention, the water content of the biomass stream is at least 40%. In an alternative form of the present invention, the water content of the biomass stream is at least 45%. In an alternative form of the present invention, the water content of the biomass stream is at least 50%. In an alternative form of the present invention, the water content of the biomass stream is at least 55%. In an alternative form of the present invention, the water content of the biomass stream is at least 60%. In an alternative form of the present invention, the water content of the biomass stream is at least 65%. In an alternative form of the present invention, the water content of the biomass stream is at least 70%. In an alternative form of the present invention, the water content of the biomass stream is at least 75%. In an alternative form of the present invention, the water content of the biomass stream is at least 80%. In an alternative form of the present invention, the water content of the biomass stream is at least 85%.

In one form of the present invention, the carbon content of the biomass stream is at least 30%. In an alternative form of the present invention, the carbon content of the biomass stream is at least 35%. In an alternative form of the present invention, the carbon content of the biomass stream is at least 40%. In an alternative form of the present invention, the carbon content of the biomass stream is at least 45%. In an alternative form of the present invention, the carbon content of the biomass stream is at least 50%. In an alternative form of the present invention, the carbon content of the biomass stream is at least 55%. In an alternative form of the present invention, the carbon content of the biomass stream is at least 60%. In an alternative form of the present invention, the carbon content of the biomass stream is at least 65%. In an alternative form of the present invention, the carbon content of the biomass stream is at least 70%. In an alternative form of the present invention, the carbon content of the biomass stream is at least 75%. In an alternative form of the present invention, the carbon content of the biomass stream is at least 80%. In an alternative form of the present invention, the carbon content of the biomass stream is at least 85%.

In a preferred form of the invention, the step of combining the feedstock with the one or more binding reagents occurs prior to the step of introducing the feedstock into an agglomeration apparatus to produce the agglomerates, such that the method comprises the steps of:

combining the feedstock with one or more binding reagents to produce an agglomeration mixture; then introducing the agglomeration mixture into an agglomeration apparatus in the presence of a polymerisation activator to produce the agglomerates.

In one form of the present invention, the polymerisation activator is contacted with the feedstock and the one or more binding reagents prior to the step of introducing the feedstock into an agglomeration apparatus to produce the agglomerates.

In a preferred form of the present invention, the polymerisation activator is contacted with the feedstock and the one or more binding reagents simultaneous to, or after the feedstock is introduced into the agglomeration apparatus.

In one form of the present invention, one or more biomass streams and binding reagents are combined with the agglomeration mixture prior to the step of:

introducing the agglomeration mixture into an agglomeration apparatus in the presence of a polymerisation activator to produce the agglomerates.

The step of combining the feedstock with one or more binding reagents to produce an agglomeration mixture is carried out in a suitable mixing apparatus. Preferably, the agglomeration mixtures is substantially homogenous.

In one form of the invention, after the step of introducing the feedstock into an agglomeration apparatus to produce the agglomerates, the method comprises the step of:

curing the agglomerates.

In one form of the present, the step of curing the agglomerates comprises stockpiling the agglomerates for a curing period. As would be understood by a person skilled in the art, the stockpiling may occur during transportation. Preferably, the step of curing the agglomerates can be enhanced by providing an increased airflow over the agglomerates. More preferably, the step of curing the agglomerates can additionally or alternatively be enhanced by stockpiling the agglomerates in a low moisture content environment at a temperature above ambient.

As discussed above, the energy required for evaporation of the water from within the agglomerates is lowered. The inventors have found that the step of curing the agglomerates may therefore be performed at a much lower temperature than prior art drying techniques. This lowers the operating cost of the curing process. In one form of the present invention, the curing step is performed at a temperatures of less than 100° C. In an alternative form of the present invention, the curing step is performed at a temperatures of less than 90° C. In an alternative form of the present invention, the curing step is performed at a temperatures of less than 80° C. In an alternative form of the present invention, the curing step is performed at a temperatures of less than 70° C. In an alternative form of the present invention, the curing step is performed at a temperatures of less than 60° C. In an alternative form of the present invention, the curing step is performed at a temperatures of less than 50° C. In an alternative form of the present invention, the curing step is performed at a temperatures of less than 40° C. In an alternative form of the present invention, the curing step is performed at a temperatures of less than 30° C. In an alternative form of the present invention, the curing step is performed at ambient temperature.

In one form of the president invention, the step of curing the agglomerates further comprises the step of:

polishing the agglomerates.

Preferably, the polishing of the agglomerates occurs in a revolving drum.

Additionally or alternatively, the step of curing the agglomerates further comprises the step of:

coating the agglomerates with a desiccation material.

Preferably, the desiccation coating material is selected from pre-treated pre-dried base feedstock such as chopped dried straw, sawdust, biomass boiler ash, powder lignin, torrified and pulverised biomass such as bagasse, sorghum, bamboo and other woody and non-woody biomass types.

In preferred form of the invention, the curing period is between 2 to 20 days. Preferably still, the curing period is 7 to 14 days. The inventor has discovered that the curing period should proceed for as until the moisture loss is no longer measurable. In order to determine this, samples of the agglomerates are weighed at regular interval in order to determine when the agglomerates have ceased losing moisture by evaporation. As would be understood by a person skilled in the art, the length of the curing period is highly dependent upon one or more of the following criteria:

whether any agglomerate treatment was performed after production (stockpile, transportation etc.);

the stockpiling technique and if "turning over" of the stockpile is carried out;

the ambient humidity and wind velocity of the curing step;

if advanced desiccants are added for rapid curing which lower surface tension of water such as alcohols, detergents or other desiccating reagents;

the temperature of the curing step;

whether the curing step is performed under cover or inside a protective environment;

the agglomerates diameter (larger the diameter the slower curing/desiccation); and whether a polishing process has been performed or a desiccation coating material has been applied.

In one form of the present invention, the agglomerates of the invention may be a pellet or a granule. Preferably, the diameter of the produced agglomerates is between 4 mm and 100 mm. As would be understood by a person skilled in the art, the size requirements of the produced agglomerates are dependent on the specific use of the final product. As would be understood by a person skilled in the art, a pellet is an agglomerated spheroid composed of mostly fine particles. As would be understood by a person skilled in the art, a granule is an agglomerated spheroid composed of both fine and coarse particles.

Preferably, the water content of the agglomerates is less the 20%. More preferably, the water content of the agglomerates is less than 19%. Still preferably, the water content of the agglomerates is less than 18%. Still preferably, the water content of the agglomerates is less than 17%. Still preferably, the water content of the agglomerates is less than 16%. Still preferably, the water content of the agglomerates is less than 15%. Still preferably, the water content of the agglomerates is less than 14%. Still preferably, the water content of the agglomerates is less than 13%. Still preferably, the water content of the agglomerates is less than 12%. Still preferably, the water content of the agglomerates is less than 11%. Still preferably, the water content of the agglomerates is less than 10%.

Preferably, the carbon content of the agglomerates is at least 50%. More preferably, the carbon content of the agglomerates is at least 55%. Still preferably, the carbon content of the agglomerates is at least 60%. Still preferably, the carbon content of the agglomerates is at least 65%. Still preferably, the carbon content of the agglomerates is at least 70%. Still preferably, the carbon content of the agglomerates is at least 75%. Still preferably, the carbon content of the agglomerates is at least 80%. Still preferably, the carbon content of the agglomerates is at least 85%.

In one form of the present invention, the agglomerates are suitable for use as combustible fuel source. The inventors have discovered that the agglomeration method of the present invention allows for the production of agglomerates of one or more biomass streams which may be suitable as a combustible fuel source. In this manner, waste streams can be used as feedstock for the production of commercial product.

Fuel agglomerates can be utilised in many applications where heat and power is required. This includes large scale co-firing with coal & lignite or as a replacement fuel in cement production. As would be understood by a person skilled in the art, the selection of the binding reagents and the number of repetitions of the combination step is dependent on both the desired end use of the agglomerates and the physical and chemical properties of the feedstock. It is envisaged that binding agent selection and Dosage amount is dependent upon the required agglomerate diameter, agglomerate strength, agglomerate water resistance and combustion and emission requirements.

As would be understood by a person skilled in the art, the suitability for an agglomerate as a fuel source is dependent on the physical properties of the agglomerates. When used as fuels, low moisture agglomerates exhibit rapid core temperature rise preventing the formation of low temperature pollutants such as dioxins and furans.

In one form of the present invention, the one or more binding reagents comprise a reagent that is able to polymerise, cross-link or form a stiff gel. Preferably, the one or more binding reagents comprise a reagent that is able to polymerise, cross-link upon contact with the polymerisation activator. More preferably, the one or more binding reagents comprise a reagent that is able to polymerise, cross-link or form a stiff gel in the absence of catalysts or external heat.

In one form of the present invention, the one or more binding reagents comprise a monomer compound. As would be understood be a person skilled in the art, a monomer compound is a compounds that can undergo polymerization thereby contributing constitutional units to the essential structure of a macromolecule. Preferably, the one or more binders are anionic or cationic monomer, optionally with a non-ionic monomer. It may be amphoteric, being formed from a mixture of cationic and anionic monomers, optionally with non-ionic monomer. Suitable anionic monomers are ethylenically unsaturated carboxylic acids or sulphonic acids, often in the form of a water soluble ammonium or, preferably, alkali metal salt. Suitable carboxylic acids are methacrylic, itaconic, maleic or, preferably, acrylic acid. Suitable sulphonic acids include allyl, methallyl, vinyl and 2-acrylamido-2-methyl propane sulphonic acids, often as ammonium, or more usually, alkali metal salt. Suitable cationic monomers include dialkylaminoalkyl (meth)-acrylamides and -acrylates, usually as acid addition or quaternary ammonium salts, and monomers such as diallyl dimethyl ammonium chloride. Suitable non-ionic monomers include (meth) acrylic esters, methacrylamide andacrylamide.

Preferably, the one or more binding reagents comprise a styrene monomer compound or a silicon monomer compound. In one form of the invention, the binding reagent comprises a styrene monomer. In one form of the invention, the binding reagent comprises a silicon monomer.

The amount of the one or more binding agents added to the biomass stream is dependant on the dry weight of the biomass stream. Preferably, the quantity of the one more binders is 0.05% to 0.5% of base chemical binder by dry weight of feedstock.

In one form of the present invention, the one or more binding reagents further comprises a surfactant. More preferably, the surfactant is selected from the group comprising alcohols, carboxylic acid, silane, siloxane or a silonol. It is understood by the inventors that the choice of surfactant is dependant on the end use of the agglomerates and the chemical content of the feedstock, especially the silica level of the biomass and the ash characteristics It is understood by the inventors that the addition of a surfactant allows for the rapid penetration of the one or more binding reagents into the feedstock. Preferably, the amount of the surfactant added is 0.025% to 0.5% by dry weight of the feedstock. In one form of the present invention, the polymerisation activator is a substance which initiates the polymerisation, cross linking or gel formation of at least one of the one or more binding reagents. Without being bound be theory, the inventors believe that the in-situ polymerisation, cross linking or gel formation of the at least one binding agent as the agglomerates is being formed in the agglomeration apparatus produces a final agglomerate product that can suitably hold a biomass feedstock stream within its matrix.

The amount of polymerization activator added to the agglomeration mixture is dependant on the dry weight of the biomass stream. Probably, the quantity of the polymerisation activator is 0.005% to 0.01% by dry weight of the biomass feedstock.

Preferably, the one or more binding reagents are combined with the feedstock prior to the addition of the polymerisation activator. Preferably the combination of the one or more binding reagents and the polymerization activator produces as substantially homogenous agglomeration mixture.

In one form of the present invention, the polymerisation activator comprises a monomer cross-linking compound. Preferably, the polymerisation activator is a vinyl, stearic or acrylic monomer crosslinking compound. It is understood that the polymerisation activator acts to polymerise or cross-link with the one or more binding reagents to form a stiff mixture helps hold wet feedstock together and simultaneously lowers the surface tension of contained water in the matrix, enhancing evaporation and desiccation.

In one form of the present invention, the one or more binding reagents may require the addition of an initiator reagent to allow or assist polymerisation. It is understood by the applicant that the initiator reagent can be any chemical species which reacts with the binder reagent monomers to form an intermediate compound capable of linking successively with a large number of other monomers into a polymeric compound. As would be understood by the person skilled din the art, most initiator reagents contain free radicals. In a highly preferred form of the present invention, initiator reagent is either ammonium persulphate $(NH_4)S_2O_8$ or potassium persulphate $K_2S_2O_8$ or a combination of both. It is understood by the inventors that the initiator reagent supplies free radicals to initiate the polymerisation of the selected reagent groups.

In one form of the present invention, the agglomerates may undergo further treatment steps. Preferably, the further treatments steps harden or seal the outer layer of the agglomerates. More preferably, the further treatment step comprises the contact of the agglomerates with a cementation additive.

In one form of the present invention, the further treatment step comprises the contact of the agglomerates with a surface modifier. It is understood by the inventors that the produced agglomerates may not be fully hardened on the outer surface and so they may stick to one another during subsequent transport. The inventors have determined that by treating the outer surface of the agglomerates with a surface modifier, that this sticking may be mitigated. Preferably, the surface modifier is applied to the surface of the agglomerates as a thin film which at least partially encapsulates the agglomerates.

In one form of the present invention, the surface modifier is preferably an aliphatic or aromatic alcohol. Without wishing to be bound by theory, it is understood by the inventors that the surface modifier polymerises with the polymerisation activator. More preferably, the surface modifier is selected from methanol, ethanol and propanol or others such as the glycols, for example ethyl and di-ethyl glycol.

In an alternative form of the present invention, the surface modifier may be combined with the agglomeration mixture prior to the formation of the agglomerates.

In one form of the present invention, one or more of the surface modifier and the initiator reagents are bactericides. In an alternative form of the present invention, one or more bactericides are added to the feedstock and or the agglomeration mixture. Advantageously, by utilising a bactericide the inventors have found that at least a portion of any bacteria and/orviral compounds within the feedstock may be destroyed.

Suitable biomass streams may be selected from, but not limited to the following: wood waste; sawdust; bark & forestry waste; agricultural waste; manures; sewage sludge; sewage trash; anaerobic digester sludge; abattoir wastes; compost & non-recyclables; wine/brewery waste; fruit waste; olive waste; vegetable oil waste; fish waste; food waste; contaminated soils; short rotation crop biomass; cellulosic lignin; bagasse; cane trash; corn stover; green waste; food waste and organic fractions of other waste streams.

In one form of the present invention the biomass stream is preferably an organic waste stream.

In one form of the present invention, the method further comprises the step of:
pre-treatment of the feedstock.

In one form of the present invention, the step of pre-treatment of the feedstock occurs prior to the step of combining the feedstock with one or more binding reagents.

As would be understood by a person skilled in the art, the biomass streams that the present invention is suitable to treat may contain solid particles of varying sizes. Large particles will interfere with the production of suitable agglomerates and so they must either be removed from the biomass feedstock or undergo a size reduction process. Preferably, the step of pre-treatment of the feedstock more specifically comprises one of more of: screening; shredding; grinding; or size reduction.

In one form of the present invention, the step of screening may be used to remove large particles from the biomass stream. Alternatively, the where biomass stream comprises large particles, the step of screening may be used to remove free water from the feedstock.

In one form of the present invention, the step of size reduction may more specifically comprise one or more of the following: mechanical size reduction; chemical fibre softening; composting; bacterial pre-treatment; enzyme pre-treatment; resin dissolution; catalyst impregnation; cellulose extraction; cellular desiccation pre-treatment; torrification; charcoaling.

As would be understood by a person skilled in the art, various treatments can be utilised to soften the woody biomass and some have particular large tonnage application. The majority of the pre-treatments rely on soaking the woodchip in various reagents that can penetrate the highly plastic lignin fibres to break bonds, dissolve resins or lubricate the fibres making them easier to part and separate.

Composting is a simple method of quickly breaking down fibres and resins into much softer products. One major advantage is the condensation of mass with significant cellular water loss, making the fibres much softer by having less bulk cellular water.

As would be understood by a person skilled in the art, treatment of biomass utilising bacteria or enzymes comprises the biological conversion of cellulosic biomass through the enzymatic hydrolysis of the cellulose. As would be understood by the person skilled in the art, pre-treatment with catalytic agents can significantly enhance enzymatic hydrolysis and granulation pre-treatment including selected catalysts can allow significant increases in enzyme conversion performance.

As would be understood by a person skilled in the art desiccation is a drying process which involves the addition of a desiccant to the biomass stream to reduce water content in the biomass stream. Advantageously, simple raw material desiccation both densifies and conditions the feed, making it much drier and much more brittle for low cost shredding and grinding prior to agglomeration. Desiccation can be carried out naturally or more practically utilising low level pre-treatment with aggressive desiccation prior to shredding and grinding, where the biomass particles are significantly more brittle, densified and require significantly less energy to grind than natural feedstock/tonne.

As would be understood by a person skilled in the art, torrification can be defined as thermal treatment of a fuel in the absence of air to a temperature where excess water is driven off and the biomass fibres are partially destroyed. Mostly utilised for fine sources of biomass such as straw or Miscanthus, torrification allows high levels of flexibility when designing a fuel for a particular market. This treatment is fast and there are off the shelf technologies that use biomass fuel, boiler exhaust or microwaves to accomplish this process. The reduction in grinding energy can be reduced to about 10% of the energy required for grinding natural wood product and energy content increased by 30-50%.

In one form of the present invention, the feedstock has the following properties following pre-treatment:
Water content range ~5% to ~80% moisture; and
Carbon content range 15% to 98%.

In one form of the present invention, a typical cured agglomerate made from cellulosic lignin has the following properties:
pellet diameter: 10 mm to 25 mm
Impact Resistance Index (1.85 m drop): 350 to 500
Bulk pellet strength–Tri-axial "Bulk modulus" @ 25 kPa loading: 350 kPa and at 50 kPa loading=500 kPa
Water resistance (remaining pellets after total immersion): 100%
Nil spontaneous combustion characteristics.

In one form of the present invention, the agglomerates are combined with one or more biomass streams and binding reagents to produce a tertiary agglomeration mixture. Preferably, the method further comprises the step of:

introducing the tertiary agglomeration mixture into an agglomeration apparatus in the presence of a polymerisation activator to produce layered agglomerate.

It is understood by the inventors that the agglomerates may be used as seed particles for the production of agglomerates with a secondary coating. It is further envisaged that the process may be repeated to produces layered agglomerates with multiple layers with different properties.

In one form of the present invention, method further comprises the addition of a seed particle to agglomeration mixture. Preferably, the seed particle acts as a agglomerate nuclei with the polymerised binding agents and one or more biomass streams forming a coating around the seed particle. It is envisaged that the seed particle may be a synthetic or natural organic substance. In one form of the present invention, the seed particles is a rubber granule. It is understood by the inventors that the use of rubber as a seed particle allows for rubber wastes, such a tyres, to be encapsulated by a layer of polymerised binding agents and one or more biomass streams. Advantageously, the combustion, gasification or pyrolysis of such particles leads to high granule core temperatures causing in-situ pyrolysis of the rubber and excellent gas transfer characteristics of the granules. This results in minimal pollutant production. It is envisaged that the seed particles may also be selected from other organic wastes, such as plastics, foams and insulation.

In accordance with a further aspect of the present invention, there is provided an agglomerate produced by the any of the above processes.

BRIEF DESCRIPTION OF THE DRAWINGS

Further features of the present invention are more fully described in the following description of two non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 1 is a flowsheet for the preparation of a combustible fuel source in accordance with one embodiment of the present invention.

DESCRIPTION OF EMBODIMENTS

Throughout this specification, unless the context requires otherwise, the word "comprise" or variations such as "comprises" or "comprising", will be understood to imply the inclusion of a stated integer or group of integers but not the exclusion of any other integer or group of integers.

In FIG. 1, there is shown a method 10 for producing agglomerates 14 which are suitable for use as a biofuel in accordance with a first embodiment of the present invention. The method 10 allows for the production of the agglomerates 14 utilising one of more organic waste feedstocks 16. The organic waste feedstock 16 undergoes a pre-treatment step 18. The pre-treatment step 18 prepares the organic feedstock for the further processing and may contain one or more of the following pre-treatment steps; screening, shredding, grinding and dewatering to produce a treated organic feedstock 20. The required pre-treatment steps depends on the physical properties of the organic feedstock 16 and one or more of the aforementioned pre-treatment steps may not be required.

The treated organic feedstock 20 is fed into a mixing step 22 where it is mixed with one or more binding reagents 24 to produce an agglomeration mixture 26. If required, additional water 28 may be added to the agglomeration mixture 26. The agglomeration mixture 26 is fed into a first agglomeration step 30 in the presence of a polymerisation activator 31 to produce agglomerates 32. The agglomerates 32 are then passed to a second agglomeration step 34 where a surface modifier 36 is sprayed on the agglomerates 32 to produce a secondary agglomerate 38. The secondary agglomerate 38 undergoes a screening step 40 to ensure correct physical specifications. Unsatisfactory agglomerates 41 are returned to the mixing step 32 for further processing. Satisfactory agglomerates are then passed to a green product curing step 42, followed by a final product curing step 44 to produce cured agglomerates 14.

Example 1

Agglomerates suitable for use as a fuel source were prepared using Cellulosic Lignin waste sourced from Cresentino Cellulosic Ethanol plant, Italy as an organic feedstock.

The binder reagent used was a styrene acrylic emulsion.

The polymerisation activator was diethylene glycol in the presence of an ammonium persulphate initiator reagent.

| Material | Dry Weight g | Wet Weight g | Calculated Water (g) | Calculated Solids % |
|---|---|---|---|---|
| Lignin sludge | 3,308 | 9,450 | | |
| Total dry feed | 3,308 | | | |
| Reagent liquid used | | 50 | | |
| Binder reagent used dry | 12.40 | | | |
| Binder water | | | | |
| Water trim added | | 0 | | |
| Total weights | 3,320 | 9,500 | 6,180 | 34.95 |

| Results | Weight g |
|---|---|
| Green pellets produced | 9,466 |
| Drum losses | 34 |
| Pellets size range | 15-25 mm |

| Desiccating Conditions |
|---|
| Tray stored open top - still air |
| No fan ventilation |
| No air conditioning |

| Ambient Conditions during desiccation - Max/Min | | | |
|---|---|---|---|
| Time | Max Temp (° C.) | Min Temp (° C.) | Humidity - reported |
| Day | 28 | 27 | 70% to 78% |
| Night | 18 | 17 | 63% to 65% |

| Day | Weight | Moisture Loss (g/d) | Total Water Loss (g) | % of wet | Solids % |
|---|---|---|---|---|---|
| 0 | 9,466 | 0 | | | |
| 1 | 8,901 | 565 | 565 | 5.97 | 37.30 |
| 2 | 8,350 | 551 | 1,116 | 11.79 | 39.76 |
| 3 | 7,780 | 570 | 1,686 | 17.81 | 42.67 |
| 4 | 7,292 | 488 | 2,174 | 22.97 | 45.53 |
| 5 | 6,825 | 467 | 2,641 | 27.90 | 48.64 |
| 6 | 6,382 | 443 | 3,084 | 45.19 | 52.02 |

| | | | | | |
|---|---|---|---|---|---|
| 7 | 5,970 | 412 | 3,496 | 54.78 | 55.61 |
| 8 | 5,540 | 430 | 3,926 | 65.76 | 59.93 |
| 9 | 5,204 | 336 | 4,262 | 76.93 | 63.80 |
| 10 | 4,892 | 312 | 4,574 | 87.89 | 67.86 |
| 11 | 4,679 | 213 | 4,787 | 97.85 | 70.95 |
| 12 | 4,439 | 240 | 5,027 | 107.44 | 74.79 |
| 13 | 4,287 | 152 | 5,179 | 116.67 | 77.44 |
| 14 | 4,182 | 105 | 5,284 | 123.26 | 79.39 |
| 15 | 4,112 | 70 | 5,354 | 128.02 | 80.74 |
| 16 | 4,050 | 62 | 5,416 | 131.71 | 81.97 |
| 17 | 3,990 | 60 | 5,476 | 135.21 | 83.21 |
| 18 | 3,945 | 45 | 5,521 | 138.37 | 84.15 |
| 19 | 3,920 | 25 | 5,546 | 140.58 | 84.69 |
| 20 | 3,892 | 28 | 5,574 | 142.19 | 85.30 |
| 21 | 3,878 | 14 | 5,588 | 143.58 | 85.61 |
| 22 | 3,865 | 13 | 5,601 | 144.43 | 85.90 |
| 45 | 3,835 | 30 | 5,631 | 145.69 | 86.57 |
| 60 | 3,815 | 20 | 5,651 | 147.35 | 87.02 |
| Final weight | 3,815 | | | | |
| Final Moisture content | | | | | 13.0% |

Example 2

Agglomerates suitable for use as a fuel source were prepared using Cellulosic Lignin waste sourced from a Korean R&D laboratory in Seoul, Korea as an organic feedstock.

The binder reagent used was a styrene acrylic emulsion.

The polymerisation activator was diethylene glycol in the presence of an ammonium persulphate initiator reagent.

| Data for Run #3 | Dry Weight g | Wet Weight g | Calculated Water (g) | Calculated Solids % |
|---|---|---|---|---|
| Lignin sludge | 2,470 | 6,500 | | |
| Total dry feed | 2,470 | | | |
| Reagent liquid used | | 37 | | |
| Binder reagent used dry | 9.26 | | | |
| Binder water | | | | |
| Water trim added | | 0 | | |
| Total weights | 2,479 | 6,537 | 4,058 | 37.93 |

| Results | Weight g |
|---|---|
| Green pellets produced | 6,505 |
| Drum losses | 32 |
| Pellets size range | 10-15 mm |

| Desiccating Conditions |
|---|
| Tray stored open top - still air |
| No fan ventilation |
| No air conditioning |

| Ambient Conditions during desiccation - Max/Min | | | |
|---|---|---|---|
| Time | Max Temp (° C.) | Min Temp (° C.) | Humidity - reported |
| Day | 34 | 31 | 70% to 78% |
| Night | 23 | 20 | 63% to 65% |

| Day | Weight | Moisture Loss (g/d) | Total Water Loss (g) | % of wet | Solids % |
|---|---|---|---|---|---|
| 0 | 6,505 | 0 | | | |
| 1 | 6,102 | 403 | 403 | 6.20 | 40.63 |
| 2 | 5,744 | 358 | 761 | 11.70 | 43.16 |
| 3 | 5,370 | 374 | 1,135 | 17.45 | 46.17 |
| 4 | 5,010 | 360 | 1,495 | 22.98 | 49.49 |
| 5 | 4,701 | 309 | 1,804 | 27.73 | 52.74 |
| 6 | 4,380 | 321 | 2,125 | 45.20 | 56.60 |
| 7 | 4,090 | 290 | 2,415 | 55.14 | 60.62 |
| 8 | 3,790 | 300 | 2,715 | 66.38 | 65.42 |
| 9 | 3,501 | 289 | 3,004 | 79.26 | 70.82 |
| 10 | 3,335 | 166 | 3,170 | 90.55 | 74.34 |
| 11 | 3,180 | 155 | 3,325 | 99.70 | 77.96 |
| 12 | 3,060 | 120 | 3,445 | 108.33 | 81.02 |
| 13 | 2,983 | 77 | 3,522 | 115.10 | 83.11 |
| 14 | 2,942 | 41 | 3,563 | 119.44 | 84.27 |
| 15 | 2,907 | 35 | 3,598 | 122.30 | 85.29 |
| 16 | 2,890 | 17 | 3,615 | 124.36 | 85.79 |
| 17 | 2,880 | 10 | 3,625 | 125.43 | 86.09 |
| 18 | 2,872 | 8 | 3,633 | 126.15 | 86.33 |
| 19 | 2,868 | 4 | 3,637 | 126.64 | 86.45 |
| 20 | 2,865 | 3 | 3,640 | 126.92 | 86.54 |
| 21 | 2,863 | 2 | 3,642 | 127.12 | 86.60 |
| 22 | 2,862 | 1 | 3,643 | 127.24 | 86.63 |
| 45 | 2,840 | 22 | 3,665 | 128.06 | 87.30 |
| 60 | 2,829 | 11 | 3,676 | 129.44 | 87.64 |
| Final weight | 2,829 | | | | |
| Final Moisture content | | | | | 12.4% |

Example 3

Agglomerates suitable for use as a fuel source were prepared using chicken litter sourced from the University of Queensland and the University of Southern Queensland as an organic feedstock.

The binder reagent used was a methoxysilane solution.

The polymerisation activator was diethylene glycol in the presence of an ammonium persulphate initiator reagent.

| Data for Run #3 | Dry Weight g | Wet Weight g | Calculated Water (g) | Calculated Solids % |
|---|---|---|---|---|
| Chicken Litter | 3,825 | 8,500 | | |
| Total dry feed | 3,825 | | | |
| Reagent liquid used | | 46 | | |
| Binder reagent used dry | 11.48 | | | |
| Binder water | | | | |
| Water trim added | | 0 | | |
| Total weights | 3,836 | 8,546 | 4,709 | 44.89 |

| Results | Weight g |
|---|---|
| Green pellets produced | 8,522 |
| Drum losses | 24 |
| Pellets size range | 10-15 mm |

| Desiccating Conditions |
|---|
| Tray stored open top - still air |
| No fan ventilation |
| No air conditioning |

| Ambient Conditions during desiccation - Max/Min | | | |
|---|---|---|---|
| Time | Max Temp (° C.) | Min Temp (° C.) | Humidity - reported |
| Day | 24 | 20 | 65% to 72% |
| Night | 15 | 12 | 52% to 56% |

| Day | Weight | Moisture Loss (g/d) | Total Water Loss (g) | % of wet | Solids % |
|---|---|---|---|---|---|
| 0 | 8,522 | 0 | | | |
| 1 | 8,006 | 516 | 516 | 6.05 | 47.92 |
| 2 | 7,560 | 446 | 962 | 11.29 | 50.75 |
| 3 | 7,159 | 401 | 1,363 | 15.99 | 53.59 |
| 4 | 6,780 | 379 | 1,742 | 20.44 | 56.59 |
| 5 | 6,420 | 360 | 2,102 | 24.67 | 59.76 |
| 6 | 6,156 | 264 | 2,366 | 36.85 | 62.32 |
| 7 | 5,903 | 253 | 2,619 | 42.54 | 64.99 |

-continued

| | | | | | |
|---|---|---|---|---|---|
| 8 | 5,680 | 223 | 2,842 | 48.15 | 67.54 |
| 9 | 5,494 | 186 | 3,028 | 53.31 | 69.83 |
| 10 | 5,350 | 144 | 3,172 | 57.74 | 71.71 |
| 11 | 5,215 | 135 | 3,307 | 61.81 | 73.57 |
| 12 | 5,090 | 125 | 3,432 | 65.81 | 75.37 |
| 13 | 4,980 | 110 | 3,542 | 69.59 | 77.04 |
| 14 | 4,884 | 96 | 3,638 | 73.05 | 78.55 |
| 15 | 4,799 | 85 | 3,723 | 76.23 | 79.94 |
| 16 | 4,715 | 84 | 3,807 | 79.33 | 81.37 |
| 17 | 4,645 | 70 | 3,877 | 82.23 | 82.59 |
| 18 | 4,590 | 55 | 3,932 | 84.65 | 83.58 |
| 19 | 4,551 | 39 | 3,971 | 86.51 | 84.30 |
| 20 | 4,532 | 19 | 3,990 | 87.67 | 84.65 |
| 21 | 4,524 | 8 | 3,998 | 88.22 | 84.80 |
| 22 | 4,520 | 4 | 4,002 | 88.46 | 84.88 |
| 45 | 4,480 | 40 | 4,042 | 89.42 | 85.64 |
| 60 | 4,460 | 20 | 4,062 | 90.67 | 86.02 |
| Final weight | 4,460 | | | | |
| Final Moisture content | | | | 14.0% | |

Example 4

Agglomerates suitable for use as a fuel source were prepared using chicken litter sourced from Lombardia, Italy as an organic feedstock.

The binder reagent used was a methoxysilane solution.

The polymerisation activator was diethylene glycol in the presence of an ammonium persulphate initiator reagent.

| Data for Run #3 | Dry Weight g | Wet Weight g | Calculated Water (g) | Calculated Solids % |
|---|---|---|---|---|
| Chicken Litter | 3,255 | 7,750 | | |
| Total dry feed | 3,255 | | | |
| Reagent liquid used | | 39 | | |
| Binder reagent used dry | 9.77 | | | |
| Binder water | | | | |
| Water trim added | | 0 | | |
| Total weights | 3,265 | 7,789 | 4,524 | 41.91 |

| Results | Weight g |
|---|---|
| Green pellets produced | 7,762 |
| Drum losses | 27 |
| Pellets size range | 8-12 mm |

Desiccating Conditions

Tray stored open top - still air
No fan ventilation
No air conditioning

Ambient Conditions during desiccation - Max/Min

| Time | Max Temp (° C.) | Min Temp (° C.) | Humidity - reported |
|---|---|---|---|
| Day | 24 | 20 | 70% to 78% |
| Night | 15 | 12 | 63% to 65% |

| Day | Weight | Moisture Loss (g/d) | Total Water Loss (g) | % of wet | Solids % |
|---|---|---|---|---|---|
| 0 | 7,762 | 0 | | | |
| 1 | 7,121 | 641 | 641 | 8.26 | 45.85 |
| 2 | 6,622 | 499 | 1,140 | 14.69 | 49.30 |
| 3 | 6,285 | 337 | 1,477 | 19.03 | 51.95 |
| 4 | 5,859 | 426 | 1,903 | 24.52 | 55.72 |
| 5 | 5,460 | 399 | 2,302 | 29.66 | 59.79 |
| 6 | 5,070 | 390 | 2,692 | 49.30 | 64.39 |
| 7 | 4,790 | 280 | 2,972 | 58.62 | 68.16 |
| 8 | 4,568 | 222 | 3,194 | 66.68 | 71.47 |

-continued

| | | | | | |
|---|---|---|---|---|---|
| 9 | 4,380 | 188 | 3,382 | 74.04 | 74.54 |
| 10 | 4,240 | 140 | 3,522 | 80.41 | 77.00 |
| 11 | 4,121 | 119 | 3,641 | 85.87 | 79.22 |
| 12 | 4,020 | 101 | 3,742 | 90.80 | 81.21 |
| 13 | 3,933 | 87 | 3,829 | 95.25 | 83.01 |
| 14 | 3,866 | 67 | 3,896 | 99.06 | 84.45 |
| 15 | 3,827 | 39 | 3,935 | 101.78 | 85.31 |
| 16 | 3,799 | 28 | 3,963 | 103.55 | 85.94 |
| 17 | 3,779 | 20 | 3,983 | 104.84 | 86.39 |
| 18 | 3,761 | 18 | 4,001 | 105.87 | 86.81 |
| 19 | 3,755 | 6 | 4,007 | 106.54 | 86.94 |
| 20 | 3,750 | 5 | 4,012 | 106.84 | 87.06 |
| 21 | 3,748 | 2 | 4,014 | 107.04 | 87.11 |
| 22 | 3,747 | 1 | 4,015 | 107.12 | 87.13 |
| 45 | 3,712 | 35 | 4,050 | 108.09 | 87.95 |
| 60 | 3,690 | 22 | 4,072 | 109.70 | 88.48 |
| Final weight | 3,690 | | | | |
| Final Moisture content | | | | 11.5% | |

Example 5

Agglomerates suitable for use as a fuel source were prepared using fine cut pine sawdust sourced from Montenegro as an organic feedstock.

The binder reagent used was a methoxysilane solution.

The polymerisation activator was silyl acetate in the presence of ammonium persulphate solution initiator reagent.

| Data for Run #3 | Dry Weight g | Wet Weight g | Calculated Water (g) | Calculated Solids % |
|---|---|---|---|---|
| Sawdust | 3,850 | 7,000 | | |
| Total dry feed | 3,850 | | | |
| Reagent liquid used | | 77 | | |
| Binder reagent used dry | 19.25 | | | |
| Binder water | | | | |
| Water trim added | | 120 | | |
| Total weights | 3,869 | 7,197 | 3,328 | 53.76 |

| Results | Weight g |
|---|---|
| Green pellets produced | 7,178 |
| Drum losses | 19 |
| Pellets size range | 15-25 mm |

Desiccating Conditions

Tray stored open top - still air
No fan ventilation
No air conditioning

Ambient Conditions during desiccation - Max/Min

| Time | Max Temp (° C.) | Min Temp (° C.) | Humidity - reported |
|---|---|---|---|
| Day | 18 | 17 | 50% to 55% |
| Night | 8 | 7 | 45% to 48% |

| Day | Weight | Moisture Loss (g/d) | Total Water Loss (g) | % of wet | Solids % |
|---|---|---|---|---|---|
| 0 | 7,178 | 0 | | | |
| 1 | 6,745 | 433 | 433 | 6.03 | 57.36 |
| 2 | 6,335 | 410 | 843 | 11.74 | 61.08 |
| 3 | 5,965 | 370 | 1,213 | 16.90 | 64.87 |
| 4 | 5,682 | 283 | 1,496 | 20.84 | 68.10 |
| 5 | 5,460 | 222 | 1,718 | 23.93 | 70.87 |
| 6 | 5,277 | 183 | 1,901 | 34.82 | 73.32 |
| 7 | 5,104 | 173 | 2,074 | 39.30 | 75.81 |
| 8 | 4,946 | 158 | 2,232 | 43.73 | 78.23 |

| | | | | | |
|---|---|---|---|---|---|
| 9 | 4,798 | 148 | 2,380 | 48.12 | 80.64 |
| 10 | 4,695 | 103 | 2,483 | 51.75 | 82.41 |
| 11 | 4,615 | 80 | 2,563 | 54.59 | 83.84 |
| 12 | 4,544 | 71 | 2,634 | 57.07 | 85.15 |
| 13 | 4,482 | 62 | 2,696 | 59.33 | 86.33 |
| 14 | 4,429 | 53 | 2,749 | 61.33 | 87.36 |
| 15 | 4,382 | 47 | 2,796 | 63.13 | 88.30 |
| 16 | 4,342 | 40 | 2,836 | 64.72 | 89.11 |
| 17 | 4,317 | 25 | 2,861 | 65.89 | 89.63 |
| 18 | 4,296 | 21 | 2,882 | 66.76 | 90.07 |
| 19 | 4,284 | 12 | 2,894 | 67.36 | 90.32 |
| 20 | 4,275 | 9 | 2,903 | 67.76 | 90.51 |
| 21 | 4,267 | 8 | 2,911 | 68.09 | 90.68 |
| 22 | 4,260 | 7 | 2,918 | 68.39 | 90.83 |
| 45 | 4,225 | 35 | 2,953 | 69.32 | 91.58 |
| 60 | 4,201 | 24 | 2,977 | 70.46 | 92.10 |
| Final weight | 4,201 | | | | |
| Final Moisture content | | | | 7.9% | |

Example 6

Agglomerates suitable for use as a fuel source were prepared using fine cut pine sawdust sourced from Scotland as an organic feedstock.

The binder reagent used was a methoxysilane solution.

The polymerisation activator was silyl acetate in the presence of ammonium persulphate solution initiator reagent.

| Data for Run #3 | Dry Weight g | Wet Weight g | Calculated Water (g) | Calculated Solids % |
|---|---|---|---|---|
| Sawdust | 3,510 | 6,750 | | |
| Total dry feed | 3,510 | | | |
| Reagent liquid used | | 70 | | |
| Binder reagent used dry | 17.55 | | | |
| Binder water | | | | |
| Water trim added | | 105 | | |
| Total weights | 3,528 | 6,925 | 3,398 | 50.94 |

| Results | Weight g |
|---|---|
| Green pellets produced | 6,902 |
| Drum losses | 23 |
| Pellets size range | 15-20 mm |

| Desiccating Conditions |
|---|
| Tray stored open top - still air |
| No fan ventilation |
| No air conditioning |

| Ambient Conditions during desiccation - Max/Min | | | |
|---|---|---|---|
| Time | Max Temp (° C.) | Min Temp (° C.) | Humidity - reported |
| Day | 22 | 20 | 65% to 72% |
| Night | 12 | 10 | 48% to 55% |

| Day | Weight | Moisture Loss (g/d) | Total Water Loss (g) | % of wet | Solids % |
|---|---|---|---|---|---|
| 0 | 6,902 | 0 | | | |
| 1 | 6,440 | 462 | 462 | 6.69 | 54.78 |
| 2 | 6,010 | 430 | 892 | 12.92 | 58.69 |
| 3 | 5,620 | 390 | 1,282 | 18.57 | 62.77 |
| 4 | 5,355 | 265 | 1,547 | 22.41 | 65.87 |
| 5 | 5,096 | 259 | 1,806 | 26.17 | 69.22 |
| 6 | 4,880 | 216 | 2,022 | 39.68 | 72.29 |
| 7 | 4,667 | 213 | 2,235 | 45.80 | 75.58 |
| 8 | 4,471 | 196 | 2,431 | 52.09 | 78.90 |
| 9 | 4,297 | 174 | 2,605 | 58.26 | 82.09 |
| 10 | 4,173 | 124 | 2,729 | 63.51 | 84.53 |
| 11 | 4,099 | 74 | 2,803 | 67.17 | 86.06 |
| 12 | 4,033 | 66 | 2,869 | 69.99 | 87.47 |
| 13 | 3,982 | 51 | 2,920 | 72.40 | 88.59 |
| 14 | 3,940 | 42 | 2,962 | 74.38 | 89.53 |
| 15 | 3,897 | 43 | 3,005 | 76.27 | 90.52 |
| 16 | 3,862 | 35 | 3,040 | 78.01 | 91.34 |
| 17 | 3,841 | 21 | 3,061 | 79.26 | 91.84 |
| 18 | 3,826 | 15 | 3,076 | 80.08 | 92.20 |
| 19 | 3,817 | 9 | 3,085 | 80.63 | 92.42 |
| 20 | 3,811 | 6 | 3,091 | 80.98 | 92.56 |
| 21 | 3,806 | 5 | 3,096 | 81.24 | 92.68 |
| 22 | 3,804 | 2 | 3,098 | 81.40 | 92.73 |
| 45 | 3,789 | 15 | 3,113 | 81.83 | 93.10 |
| 60 | 3,780 | 9 | 3,122 | 82.40 | 93.32 |
| Final weight | 3,780 | | | | |
| Final Moisture content | | | | 6.7% | |

Example 7

Agglomerates suitable for use as a fuel source were prepared using a mixture of sewage digestate sourced from the University of Queensland and bagasse compost sourced in Queensland as an organic feedstock. The mixture of the organic feedstock was 50:50 by dry weight.

The binder reagent used was a styrene acrylic emulsion.

The polymerisation activator was diethylene glycol in the presence of an ammonium persulphate initiator reagent.

| Data for Run #3 | Dry Weight g | Wet Weight g | Calculated Water (g) | Calculated Solids % |
|---|---|---|---|---|
| Sludge & Biomass | 2,384 | 7,450 | | |
| Total dry feed | 2,384 | | | |
| Reagent liquid used | | 48 | | |
| Binder reagent used dry | 11.92 | | | |
| Binder water | | | | |
| Water trim added | | 0 | | |
| Total weights | 2,396 | 7,498 | 5,102 | 31.96 |

| Results | Weight g |
|---|---|
| Green pellets produced | 7,441 |
| Drum losses | 57 |
| Pellets size range | 10-15 mm |

| Desiccating Conditions |
|---|
| Tray stored open top - still air |
| No fan ventilation |
| No air conditioning |

| Ambient Conditions during desiccation - Max/Min | | | |
|---|---|---|---|
| Time | Max Temp (° C.) | Min Temp (° C.) | Humidity - reported |
| Day | 32 | 29 | 70% to 65% |
| Night | 21 | 20 | 66% to 65% |

| Day | Weight | Moisture Loss (g/d) | Total Water Loss (g) | % of wet | Solids % |
|---|---|---|---|---|---|
| 0 | 7,441 | 0 | | | |
| 1 | 6,919 | 522 | 522 | 7.02 | 34.63 |
| 2 | 6,429 | 490 | 1,012 | 13.60 | 37.27 |
| 3 | 5,955 | 474 | 1,486 | 19.97 | 40.23 |
| 4 | 5,505 | 450 | 1,936 | 26.02 | 43.52 |
| 5 | 5,093 | 412 | 2,348 | 31.55 | 47.04 |
| 6 | 4,705 | 388 | 2,736 | 53.72 | 50.92 |
| 7 | 4,353 | 352 | 3,088 | 65.63 | 55.04 |

-continued

| | | | | | |
|---|---|---|---|---|---|
| 8 | 4,040 | 313 | 3,401 | 78.13 | 59.30 |
| 9 | 3,747 | 293 | 3,694 | 91.44 | 63.94 |
| 10 | 3,481 | 266 | 3,960 | 105.68 | 68.83 |
| 11 | 3,286 | 195 | 4,155 | 119.36 | 72.91 |
| 12 | 3,196 | 90 | 4,245 | 129.18 | 74.97 |
| 13 | 3,125 | 71 | 4,316 | 135.04 | 76.67 |
| 14 | 3,059 | 66 | 4,382 | 140.22 | 78.32 |
| 15 | 3,011 | 48 | 4,430 | 144.82 | 79.57 |
| 16 | 2,978 | 33 | 4,463 | 148.22 | 80.45 |
| 17 | 2,951 | 27 | 4,490 | 150.77 | 81.19 |
| 18 | 2,936 | 15 | 4,505 | 152.66 | 81.60 |
| 19 | 2,926 | 10 | 4,515 | 153.78 | 81.88 |
| 20 | 2,918 | 8 | 4,523 | 154.58 | 82.11 |
| 21 | 2,912 | 6 | 4,529 | 155.21 | 82.28 |
| 22 | 2,908 | 4 | 4,533 | 155.67 | 82.39 |
| 45 | 2,843 | 65 | 4,598 | 158.12 | 84.27 |
| 60 | 2,818 | 25 | 4,623 | 162.61 | 85.02 |
| Final weight | 2,818 | | | | |
| Final Moisture content | | | | 15.0% | |

Example 8

Agglomerates suitable for use as a fuel source were prepared using a mixture of sewage digestate and fine cut pine sawdust each sourced from Lombardia, Italy as an organic feedstock. The mixture of the organic feedstock was 50:50 by dry weight.

The binder reagent used was a methoxysilane solution.

The polymerisation activator was silyl acetate in the presence of ammonium persulphate solution initiator reagent.

| Data for Run #3 | Dry Weight g | Wet Weight g | Calculated Water (g) | Calculated Solids % |
|---|---|---|---|---|
| Sludge & Sawdust | 2,830 | 7,860 | | |
| Total dry feed | 2,830 | | | |
| Reagent liquid used | | 57 | | |
| Binder reagent used dry | 14.15 | | | |
| Binder water | | | | |
| Water trim added | | 0 | | |
| Total weights | 2,844 | 7,917 | 5,073 | 35.92 |

| Results | Weight g |
|---|---|
| Green pellets produced | 7,895 |
| Drum losses | 22 |
| Pellets size range | 10-20 mm |

Desiccating Conditions

Tray stored open top - still air
No fan ventilation
No air conditioning

Ambient Conditions during desiccation - Max/Min

| Time | Max Temp (° C.) | Min Temp (° C.) | Humidity - reported |
|---|---|---|---|
| Day | 23 | 21 | 55% to 62% |
| Night | 11 | 12 | 45% to 53% |

| Day | Weight | Moisture Loss (g/d) | Total Water Loss (g) | % of wet | Solids % |
|---|---|---|---|---|---|
| 0 | 7,895 | 0 | | | |
| 1 | 7,351 | 544 | 544 | 6.89 | 38.69 |
| 2 | 6,850 | 501 | 1,045 | 13.24 | 41.51 |
| 3 | 6,365 | 485 | 1,530 | 19.38 | 44.68 |
| 4 | 5,903 | 462 | 1,992 | 25.23 | 48.17 |
| 5 | 5,470 | 433 | 2,425 | 30.72 | 51.99 |
| 6 | 5,079 | 391 | 2,816 | 51.48 | 55.99 |
| 7 | 4,731 | 348 | 3,164 | 62.30 | 60.11 |
| 8 | 4,426 | 305 | 3,469 | 73.32 | 64.25 |
| 9 | 4,145 | 281 | 3,750 | 84.73 | 68.61 |
| 10 | 3,872 | 273 | 4,023 | 97.06 | 73.44 |
| 11 | 3,623 | 249 | 4,272 | 110.33 | 78.49 |
| 12 | 3,477 | 146 | 4,418 | 121.94 | 81.79 |
| 13 | 3,389 | 88 | 4,506 | 129.59 | 83.91 |
| 14 | 3,322 | 67 | 4,573 | 134.94 | 85.60 |
| 15 | 3,267 | 55 | 4,628 | 139.31 | 87.04 |
| 16 | 3,224 | 43 | 4,671 | 142.98 | 88.21 |
| 17 | 3,193 | 31 | 4,702 | 145.84 | 89.06 |
| 18 | 3,171 | 22 | 4,724 | 147.95 | 89.68 |
| 19 | 3,162 | 9 | 4,733 | 149.26 | 89.94 |
| 20 | 3,156 | 6 | 4,739 | 149.87 | 90.11 |
| 21 | 3,152 | 4 | 4,743 | 150.29 | 90.22 |
| 22 | 3,150 | 2 | 4,745 | 150.54 | 90.28 |
| 45 | 3,135 | 15 | 4,760 | 151.11 | 90.71 |
| 60 | 3,130 | 5 | 4,765 | 151.99 | 90.85 |
| Final weight | 3,130 | | | | |
| Final Moisture content | | | | 9.1% | |

The invention claimed is:

1. A method for producing agglomerates from a feedstock comprising at least one biomass stream, the method comprising the steps of:
    combining the feedstock with one or more binding reagents, wherein the one or more binding reagents comprise a monomer compound; and
    introducing the feedstock into an agglomeration apparatus in the presence of a polymerisation activator to produce the agglomerates, wherein the polymerisation activator is a substance which initiates the polymerisation or cross-linking of the one or more binding reagents.

2. A method according to claim 1, wherein the step of combining the feedstock with the one or more binding reagents occurs prior to the step of introducing the feedstock into the agglomeration apparatus to produce the agglomerates, such that the method comprises the steps of:
    combining the feedstock with the one or more binding reagents to produce an agglomeration mixture; then
    introducing the agglomeration mixture into the agglomeration apparatus in the presence of the polymerisation activator to produce the agglomerates.

3. A method according to claim 1, wherein the polymerisation activator is contacted with the feedstock and the one or more binding reagents prior to the step of introducing the feedstock into the agglomeration apparatus to produce the agglomerates.

4. A method according to claim 1, wherein the polymerisation activator is contacted with the feedstock and the one or more binding reagents simultaneous to, or after the feedstock is introduced into the agglomeration apparatus.

5. A method according to claim 2, wherein one or more further biomass streams and/or binding reagents are combined with the agglomeration mixture prior to the step of:
    introducing the agglomeration mixture into the agglomeration apparatus in the presence of the polymerisation activator to produce the agglomerates.

6. A method according to claim 1, wherein the one or more binding reagents is a styrene monomer compound or a silicon monomer compound.

7. A method according to claim 1, wherein the one or more binding reagents further comprises a surfactant.

8. A method according to claim 1, wherein the polymerisation activator is a monomer cross-linking compound.

9. A method according to claim 1, wherein the agglomerates undergo further treatment to harden or seal the outer layer of the agglomerates.

10. A method according to claim 9, wherein the further treatment comprises the application of a surface modifier to the surface of the agglomerates.

11. A method according to claim 1, wherein the method further comprises the contact of one or more binding reagents with an initiator reagent.

12. A method according to claim 1, wherein the method further comprises the step of:
pre-treatment of the feedstock.

13. A method according to claim 12, wherein the step of pre-treatment of the feedstock occurs prior to the step of combining the feedstock with one or more binding reagents.

14. A method according to claim 12, wherein the step of pre-treatment of the feedstock comprises one of more of screening, shredding, grinding or size reduction of the feedstock.

15. A method according to claim 12, wherein the feedstock has a water content range of 5% to 80% moisture following the pre-treatment step.

16. A method according to claim 12, wherein the feedstock has a carbon content range of 15% to 98% following properties following the pre-treatment step.

17. A method according to claim 1, wherein the method comprises the step of:
curing the agglomerates.

18. A method according to claim 17, wherein the step of curing the agglomerates further comprises the step of:
polishing the agglomerates for a polishing period.

19. A method according to claim 17, wherein the step of curing the agglomerates comprises the step of:
coating the agglomerates with a desiccation material.

20. A method according to claim 1, wherein the agglomerates are pellets or granules.

21. A method according to claim 1, wherein the agglomerates are suitable for use as combustible fuel source.

* * * * *